Sept. 2, 1969         H. JACOB                3,464,668
HIGHLY FLUID-TIGHT VALVE AND CORRESPONDING ELECTRO-VALVES
Filed Oct. 14, 1966                         2 Sheets-Sheet 1

Inventor:
Henri Jacob
By
Karl W. Flocks
Attorney

Sept. 2, 1969             H. JACOB             3,464,668
HIGHLY FLUID-TIGHT VALVE AND CORRESPONDING ELECTRO-VALVES
Filed Oct. 14, 1966             2 Sheets-Sheet 2
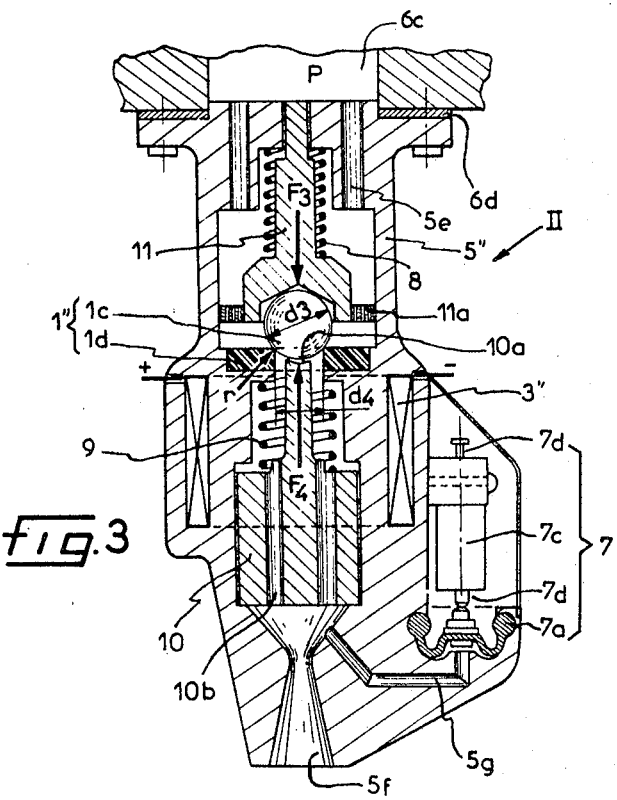
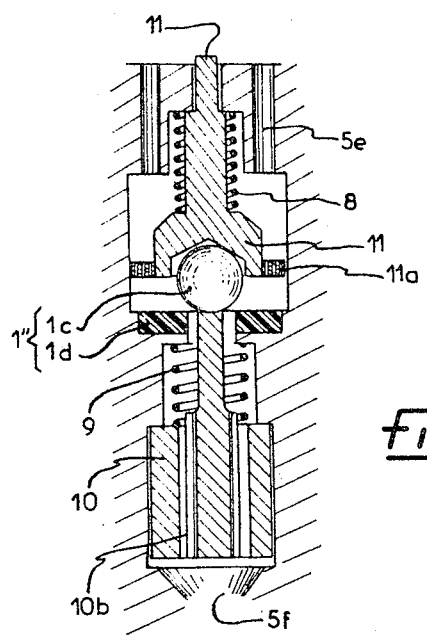

United States Patent Office 3,464,668
Patented Sept. 2, 1969

3,464,668
HIGHLY FLUID-TIGHT VALVE AND CORRESPONDING ELECTRO-VALVES
Henri Jacob, Paris, France, assignor to Nord-Aviation Societe Nationale de Constructions Aeronautiques, Paris, France, a joint-stock company of France
Filed Oct. 14, 1966, Ser. No. 586,726
Claims priority, application France, Dec. 17, 1965, 42,865
Int. Cl. F16k *31/06, 25/00*
U.S. Cl. 251—129
7 Claims

ABSTRACT OF THE DISCLOSURE

A highly fluid-tight valve utilizing a ball seated on an opening of a cylinder with double spring pressure opposing fluid pressure and solenoid operation opposing the spring pressure, one spring acting on a piston in direct contact with the ball and the other exerting pressure on the body attracted by the solenoid coil.

---

The present invention relates to a highly fluid-tight valve and also to electro-valves fitted with said valve.

In various fields, especially that of ballistic devices or artificial satellites, the problems inherent in the valves of the electro-valves controlling the gas jets intended for the stabilization nozzles are well known; in order to prevent the risk of accidental emptying of the gas tank, the said electro-valves must not have a leakage level with the valve closed, which exceeds $10^{-9}$ cu. cm./sec. of helium brought back to normal conditions and this condition must be observed in spite of at least one million cycles of opening and closure.

It is also known that numerous essential conditions such as those of small overall size, low weight, short opening or closure time of the value, low electrical consumption, nonmagnetism, high resistance both to radiations of any kind and to great differences in temperature, etc., result in the necessity of forming a set of conditions for which a type of equipment having quite special characteristics is essential.

Electro-valves intended for such uses are of course well known, but none of them satisfies conjointly all the required conditions.

In consequence, the present invention has for its object a highly fluid-tight valve which satisfies the fixed conditions and which is essentially characterized by the fact that it is constituted by a ball, a cylindrical seating in the opening of which the ball comes to rest in the valve-closed position, and by means for applying in this said position, the said ball against its seating with an appropriate force of application.

The ball is of special metal, of the bearing steel type, while the seating of the valve is constituted by an organic compound of the polytetrafluoro-ethylene type or a super-polyamide.

The ratio between the diameter of the ball and the diameter of the opening of the seating is in the vicinity of 1.5.

The ball and the seating have a surface condition approximating to the class known as "super-finish."

The radius of the edge of the ball seating is of the order of a few microns.

The means for applying the ball against its seating employ either the pressure force produced directly by the fluid in a circuit upstream of the valve, or the mechanical force produced by at least one spring acting in opposition to the said fluid pressure in a circuit downstream of the valve.

In the circuit of the valve, means are provided for ensuring during opening, an opening that is to say a progressive liberation of the ball from the seating, without any bouncing or shock of the ball taking place.

The invention has also for its object an electro-valve fitted with a highly fluid-tight valve such as described above and further essentially characterized by the fact that, according to a first possible form of construction, that is to say in the case of a downstream circuit of the valve, the electro-valve further comprises an electro-magnet with a plunger core, a piston sliding inside the said core and of which one flared face is constantly in contact with the surface of the ball against which it is applied by the action of a first compression spring arranged inside the core and a second compression spring for the application of a mechanical force on the plunger core, acting in opposition simultaneously to the force of attraction of the electro-magnet and to the pressure force produced by the fluid on the ball, these various elements being coaxial with each other.

The reaction force of the spring applied directly on the piston of the plunger core is equal to about 1.5 times the force of the pressure of the fluid on the ball; the force produced by the reaction of the external spring directly compressing the plunger core and opposing the force of attraction of the electro-magnet is greater than the force of the reaction of the spring applied against the piston, and the force of attraction produced by the electro-magnet coil should be greater than the above force directly compressing the plunger core and produced by the external spring.

During the opening of the valve, the electro-magnet first attracts the plunger core, which then in its movement carries the piston against the flared face of which the ball is constantly in contact, while the latter is simultaneously and gradually freed from its seating.

According to a second posisble form of construction, in which the valve is mounted upstream of the fluid pressure, that is to say in which the ball is applied on its seating by the force of the fluid pressure, the electro-valve comprises an electro-magnet with a coaxial coil and plunger core, the shaft of this latter terminating in a flared portion which, during the opening of the valve, by attraction of the coil of the electro-magnet, passes through the orifice of the seating so as to push and free the ball from its housing; a restoring spring of the said plunger core in the bottom of its housing; and a device for ensuring the guiding and shockless opening of the valve and comprising a cap of which one flared face is constantly in contact with the surface of the ball under the action of a compression spring.

Other advantages and characteristic features of the present invention will be brought out in the description which follows below of two preferred forms of embodiment of this invention, these embodiments being given by way of example and with reference to the accompanying drawings, in which:

FIG. 3 is a diagrammatic section taken in the longitudinal axis of a second possible form of construction of an electro-valve according to the invention, in which the ball is located, with respect to its seating, on the upstream side of the pressure, the valve being shown in the closed position.

FIG. 4 is a partial diagrammatic section taken from FIG. 3, in which the valve according to the invention is shown in the open position.

Figure 1:
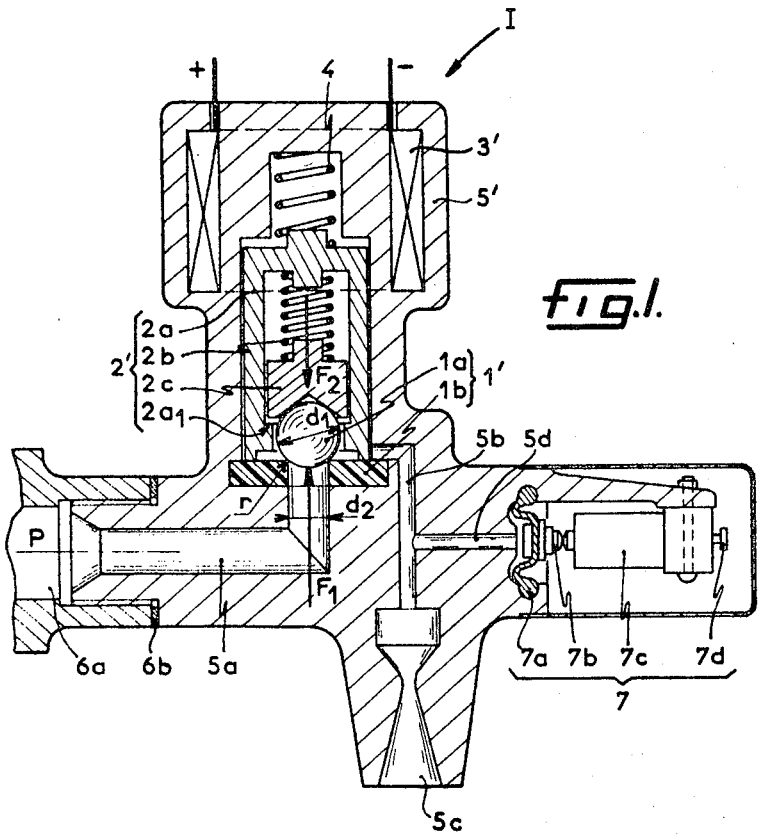
FIG. 1 is a diagrammatic cross-section taken along the longitudinal axis of a first possible form of construction of an electro-valve according to the invention, in which the ball is located, with respect to its seating, on the downstream side of the pressure, the valve being in the closed position.

FIG. 1, which shows on a very large scale the first possible form of construction of an electro-valve according to the invention, designated as a whole by the reference I on the drawing, shows the arrangement of the various parts such as the valve 1' constituted by a ball 1a and a seating 1b, of which the ratio of the diameters $d_1/d_2$ is approximately 1.66.

The valve 1' is mounted concentrically with the axis of a plunger core 2', constituted by a body 2a, a piston 2c and a compression spring 2b, the said plunger core being itself at the same time coaxial to an attraction coil 3' and pushed by a compression spring 4, the assembly thus formed being then housed in the interior of a body 5' which holds these various elements in position and ensures a rigid and fluid-tight connection by the joint 6b, with the orifice 6a in communication with a fluid pressure-reducing device, not shown on the drawing.

In addition, a system of conduits such as 5a, between the pressure-reducing device and the valve 1', 5b between the valve and the discharge nozzle, 5c and 5d between the evacuation conduit 5b and a pressure detector 7, which is composed of a fluid-tight diaphragm 7a, a finger 7b and an electric contactor 7c adjustable at 7d, permitting on the one hand the evacuation to the exterior of a quantity of fluid determined by the period of opening of the valve, and on the other hand the recording of the duration of this evacuation in an electrical form.

FIG. 3, which also shows to a very large scale the second form of electro-valve designated as a whole by the reference II on the drawing, shows the arrangement of the various members such as the valve 1", constituted by a ball 1c and a seating 1d, the ratio of the diameters of which $d_3/d_4$ is approximately 1.47; this valve 1" is placed concentrically with the axis of a plunger core 10 which terminates in a flared portion 10a, the said plunger core being applied against the bottom of its housing by a spring 9 and arranged coaxially with an attraction coil 3". The ball 1c is retained by a cap 11 guided in bores formed in the body 5", and a spring 8 applies it against the seating 1d. Passage conduits provided at 5e, 11a, 10b, lead the fluid to the discharge nozzle 5f, and an auxiliary conduit 5g permits the detector 7 to record, in the form of electric pulses, the period of opening of the valve. Similarly, a fixing device with a joint 6d permits the fluid-tight and rigid coupling of the body 5" on the mouthpiece 6c.

In the two preferred forms of embodiment described above, the ball may be made of 100 C6 steel with a surface condition having a roughness factor of the order of $0.025\mu$, and the valve seating may be of a polytetra fluoroethylene or "Teflon" with a contact radius comprised between 3 and $5\mu$, the weight of the ball being between 32 and 65 milligrams, depending on the case. The two electro-valves I and II shown in FIGS. 1 and 3, can advantageously have their largest dimension of the order of 3 cm.

In the text which follows below, the operation of the valve and electro-valves according to the invention, will be described in connection with the use for which these equipments are preferably intended, namely the stabilization of artificial satellites. In consequence, it should first be recalled that this stabilization is obtained by jets of gas, particularly of nitrogen, expanded to about 3 bars and taking place in a vacuum in the vicinity of $10^{-5}$ torr, that the ambient temperature varies between $-20$ and $+60°$ C., that the reliability of the apparatus must be such that the initial characteristics must be unchanged after $10^6$ cycles of operation, that the electrical consumption must not exceed about 5 watts, that the number of magnetic parts is limited, that all the constituent materials must be taken from those chosen for their resistance to radiations of all kinds and for their low density, and that finally, the duration of the gas pulses must be as accurate as possible, involving operating times of the valve of between 2.8 and 6 milliseconds for the opening and 1.9 to 3 milliseconds for the closure.

The high performances obtained by electro-valves of this kind are essentially due to the principle of the self-centering of a free ball on its seating, to the physical properties of the materials employed together with their surface condition and their geometrical shape, and finally to the very small stresses applied to the ball and its seating.

Figure 2:
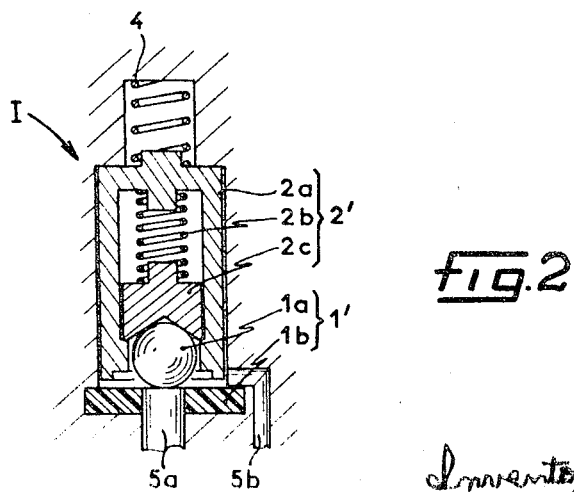
FIG. 2 is a partial diagrammatic section taken from FIG. 1, and in which the valve is shown in the open position.

Thus, in the case of the electro-valve I of FIG. 1, if the force $F_1$ represents the product of the unit pressure P times the section of passage $d_2$, the force of application $F_2$ produced by the reaction of the spring 2b should be approximately 1.5 $F_1$. Similarly, the force produced by the reaction of the spring 4 should be greater than $F_2$ and the force of attraction produced by the coil 3' should in turn be greater than that produced by the spring 4. This leads to the consideration that, at the moment when the plunger core is attracted by the coil, the body 2a begins its upward movement until it comes into contact with the piston 2c, which from that moment plunger core 2 carries away with it (FIG. 2) by its shoulder $2a_1$ up to the end of the travel of the said piston and that the movement of this piston then frees the ball from its pressure which, when free, opens in its turn the seating 1b, thereby permitting the free passage of the fluid which then flows through 5b towards the discharge nozzle 5c.

There is thus obtained a gradual and yet very rapid opening of the valve without knocks or shocks on the ball. At the instant following, or closure, the plunger core 2' being released, the spring 4 instantaneously pushes back the body 2a which returns to its initial position against the seating 2b, thus permitting the ball to return against its seating since, at that moment, the piston 2c, pushed by the spring 2b, applies to the ball a force $F_2 > F_1$.

On the other hand, in the case of the electro-valve II of FIG. 3, if the force $F_3$ represents the product of the unit pressure P times the section $d_4$, the force of attraction $F_4$ of the coil should be greater than the force $F_3$, and the reaction forces of the springs 8 and 9 may then be on the one hand as small as may be desired, since the first force must simply produce the thrust of the cap 11 which guides the ball, and on the other hand, the second force must be sufficient to bring the plunger core 10 rapidly into its initial position of rest.

To this end, FIG. 4 shows an arrangement of the parts such that, when the plunger core is attracted by the coil, the cap 11 and the flared extremity 10a of the plunger core have no other object than to permit the movement of the ball 1c in the axis of symmetry, while however applying only a minimum pressure on the said ball.

The present description has deliberately omitted the special techniques appropriate to the assembly or the operation of certain constituent elements of the electro-valves, such as the fluid-tightness of the valve seating with respect to the body, the reduction of friction by adequate clearances and brushings, the constitution of the coil, etc., all these techniques being well known in the art and not forming the object of the present invention.

I claim:
1. An electro-valve comprising
   a highly fluid-tight valve mounted on the downstream side of the fluid pressure including
      a cylindrical seating,
      and a ball resting in said cylindrical seating during the closed position of said valve,
   means for operating said valve and ensuring the progressive liberation of said ball from said seating without bouncing or shocks on said ball during the opening of said valve including
      an electromagnet having a hollow plunger core,
      means slidable in said core constantly in contact with the surface of said bulb, a first compression spring within said core compressed between an inner portion of said core and said slidable means in a direction to press said slidable means against said ball, and exerting a force at least equal to the force of the fluid pressure against said ball, and a second compression spring outside said core and compressed by said core in a direction to produce a mechanical force simultaneously in opposition to the force of attraction of said electromagnet and to the pressure produced by the fluid on said ball.

2. An electro-valve in accordance with claim 1, further characterized by said first compression spring exerting a force greater than the force of the fluid pressure against said ball.

3. An electro-valve in accordance with claim 2, further characterized by the force of the reaction of said first compression spring being equal to about 1.5 times the force of the fluid pressure on said ball; and the force of the reaction of said second compression spring being greater than the force of the reaction of said first compression spring and less than the force of attraction of said electromagnet.

4. An electro-valve in accordance with claim 1, further characterized by said slidable means being a piston slidable in said core and having one flared face constantly in contact with the surface of said ball and said first compression spring contacting said piston on its side opposite from the side of said piston contacting said ball.

5. An electro-valve comprising
a highly fluid-tight valve including
a cylindrical seating,
and a ball resting in said cylindrical seating during the closed position of said valve,
means for operating said valve and ensuring the progressive liberation of said ball during the opening of said valve including
an electromagnet having a plunger core,
slidable means constantly in contact with the surface of said ball,
a first compression spring compressed against said slidable means exerting a force in a direction to press said slidable means against said ball,
and a second compression spring compressed against said plunger core exerting a force in a direction to move said core away from said ball in opposition to the force of attraction of said electromagnet and retain said plunger core out of contact with said ball when said valve is in a closed position.

6. An electro-valve in accordance with claim 5, further characterized by
a flared portion on said plunger core contacting the surface of said ball when said valve is in an open position,
and a flared face on said slidable means constantly in contact with the surface of said ball.

7. An electro-valve in accordance with claim 6, further characterized by said flared portion and said flared face facing each other on opposite sides of said ball.

References Cited

UNITED STATES PATENTS

| | | | |
|---|---|---|---|
| 1,115,256 | 10/1914 | Torbert | 251—82 |
| 1,229,860 | 6/1917 | Ashelman et al. | 137—554 XR |
| 2,695,628 | 11/1954 | Wheildon | 251—359 XR |
| 2,822,818 | 2/1958 | Breznick | 251—129 XR |
| 2,930,578 | 3/1960 | Piros | 251—138 XR |
| 3,043,336 | 7/1962 | Parent et al. | 251—139 XR |
| 3,107,893 | 10/1963 | Bashe | 251—129 XR |
| 3,324,889 | 6/1967 | Batts | 251—139 XR |

OTHER REFERENCES

German printed application 1,179,068, October 1964, NILL.

HENRY T. KLINKSIEK, Primary Examiner

U.S. Cl. X.R.

251—86, 139; 137—554